No. 674,002. Patented May 14, 1901.
M. GEHRE.
DEVICE FOR UTILIZING THE POWER OF WAVES.
(Application filed Apr. 12, 1899.)

(No Model.) 5 Sheets—Sheet 1.

WITNESSES: INVENTOR
Fred White Max Gehre,
Thomas F. Wallace By his Attorneys:

No. 674,002. Patented May 14, 1901.
M. GEHRE.
DEVICE FOR UTILIZING THE POWER OF WAVES.
(Application filed Apr. 12, 1899.)
(No Model.) 5 Sheets—Sheet 2.
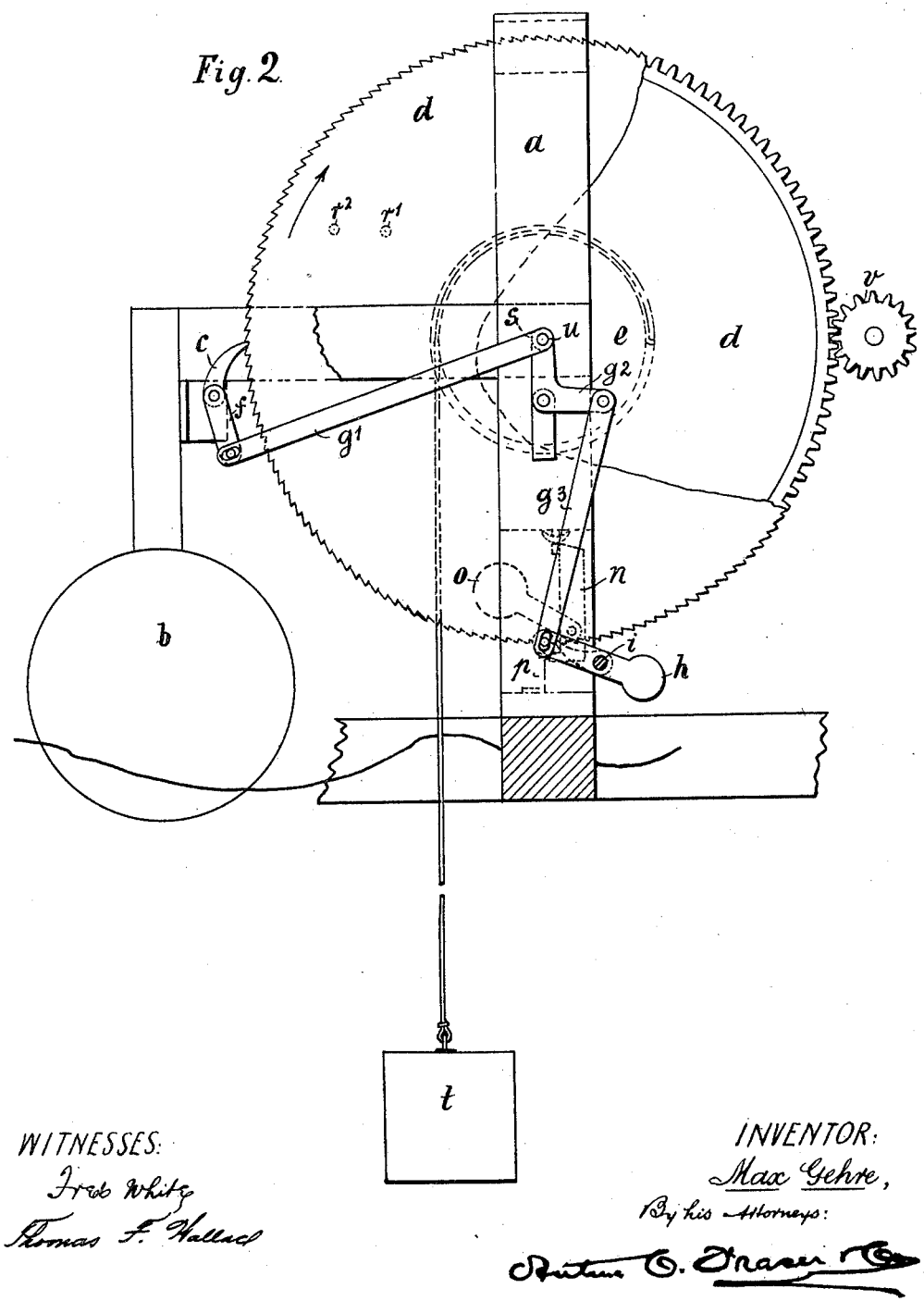

No. 674,002. Patented May 14, 1901.
M. GEHRE.
DEVICE FOR UTILIZING THE POWER OF WAVES.
(Application filed Apr. 12, 1899.)
(No Model.) 5 Sheets—Sheet 3.

WITNESSES:
Fred White
Thomas F. Wallack

INVENTOR:
Max Gehre,
By his Attorneys:

No. 674,002. Patented May 14, 1901.
M. GEHRE.
DEVICE FOR UTILIZING THE POWER OF WAVES.
(Application filed Apr. 12, 1899.)

(No Model.) 5 Sheets—Sheet 4.

WITNESSES:
Fred White
Thomas F. Wallace

INVENTOR:
Max Gehre,
By his Attorneys:
Arthur C. Fraser & Co.

THE NORRIS PETERS CO., PHOTO-LITHO., WASHINGTON, D. C.

No. 674,002. Patented May 14, 1901.
M. GEHRE.
DEVICE FOR UTILIZING THE POWER OF WAVES.
(Application filed Apr. 12, 1899.)
(No Model.) 5 Sheets—Sheet 5.
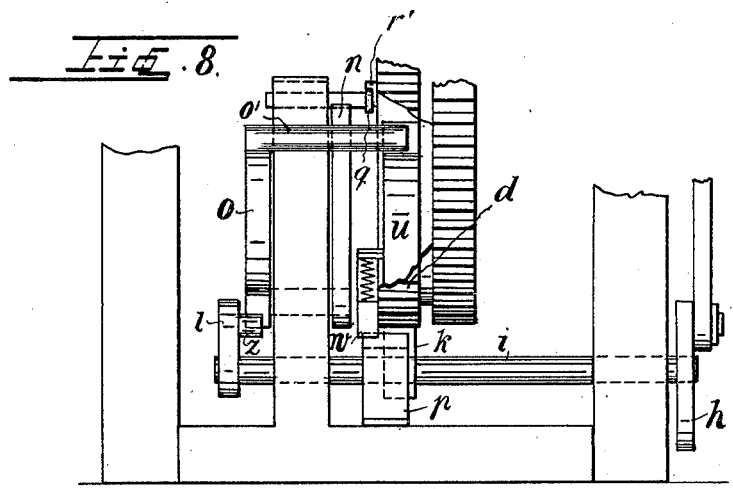
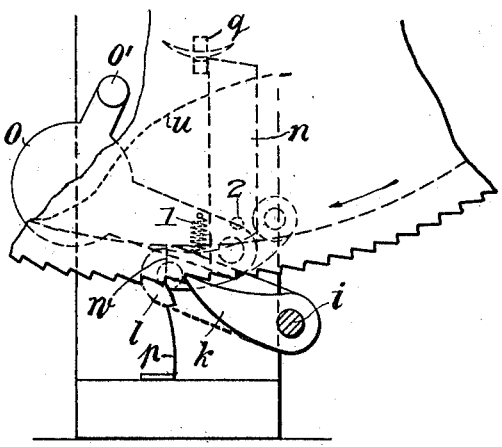
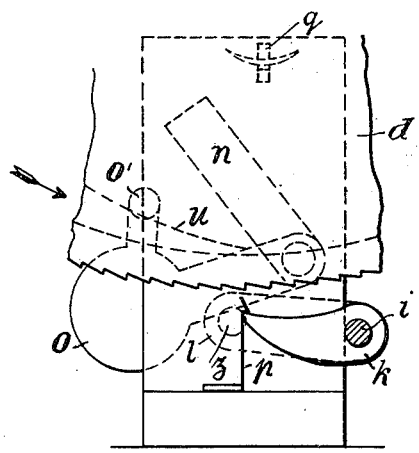
WITNESSES:
Fred White
Thomas F. Wallace
INVENTOR:
Max Gehre,
By his Attorneys:

UNITED STATES PATENT OFFICE.

MAX GEHRE, OF RATH, GERMANY.

DEVICE FOR UTILIZING THE POWER OF WAVES.

SPECIFICATION forming part of Letters Patent No. 674,002, dated May 14, 1901.

Application filed April 12, 1899. Serial No. 712,698. (No model.)

*To all whom it may concern:*

Be it known that I, MAX GEHRE, engineer, a subject of the German Emperor, residing at Rath, near Düsseldorf, in the German Empire, have invented certain new and useful Improvements in Wave-Motors; and I do hereby declare the following to be a full, clear, and exact description of the invention, such as will enable others skilled in the art to which it appertains to make and use the same.

Known devices for utilizing or accumulating the power of the waves of the sea, and in which the waves act by means of ratchet-gearing for rotating a shaft, work with uninterrupted movement—for instance, for compressing air for driving purposes and the like. On the contrary, in the ratchet-gearing which forms the object of the present invention an automatic releasing or disconnection takes place periodically in such a way that the power accumulated by a number of ratchet movements is utilized for a longer backward movement, by means of which an electric current may be generated by suitable devices. For this object the ratchet-gearing is subjected to the action of a releasing mechanism in such a way that after a given rotation of the ratchet-wheel the ratchet-gearing, by means of a releasing mechanism, is released or disconnected, with the object of producing by the action of a weight or a spring the backward movement of the ratchet-wheel by which the releasing mechanism is returned to its initial position and the ratchet-gearing is again engaged for another number of forward movements.

Figure 1:
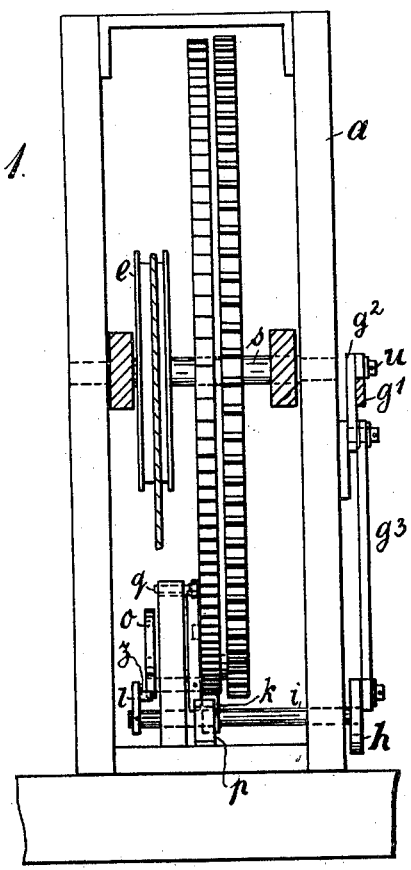
Figure 3:
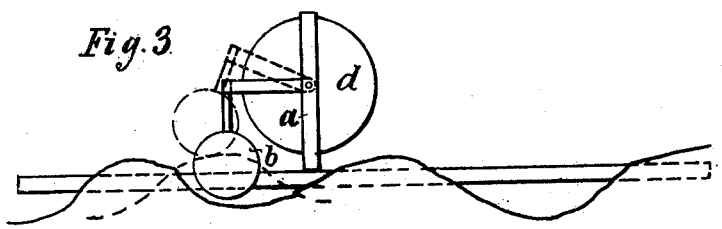
Figure 4:
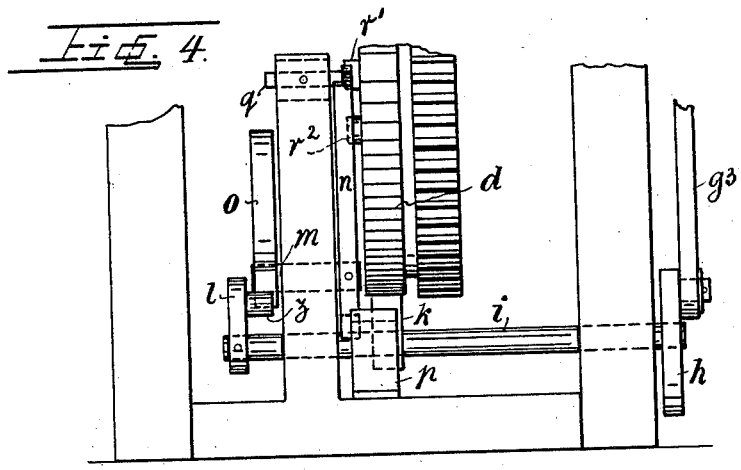
Figure 5:
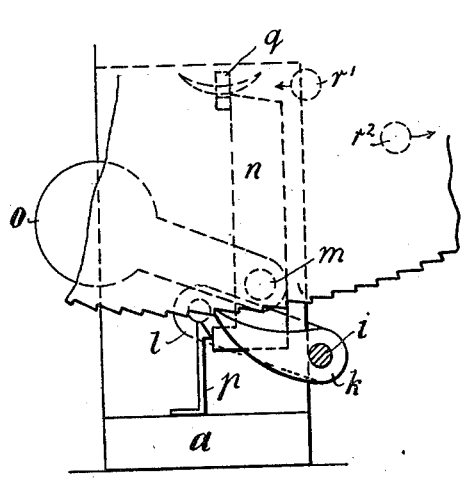
Figure 6:
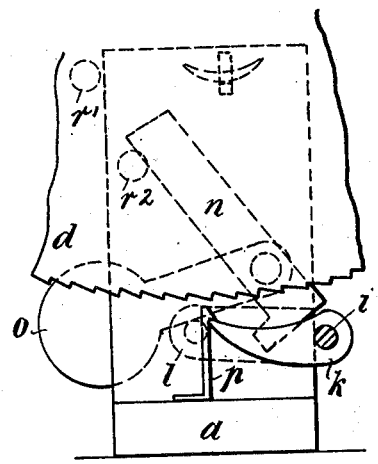
Figure 7:
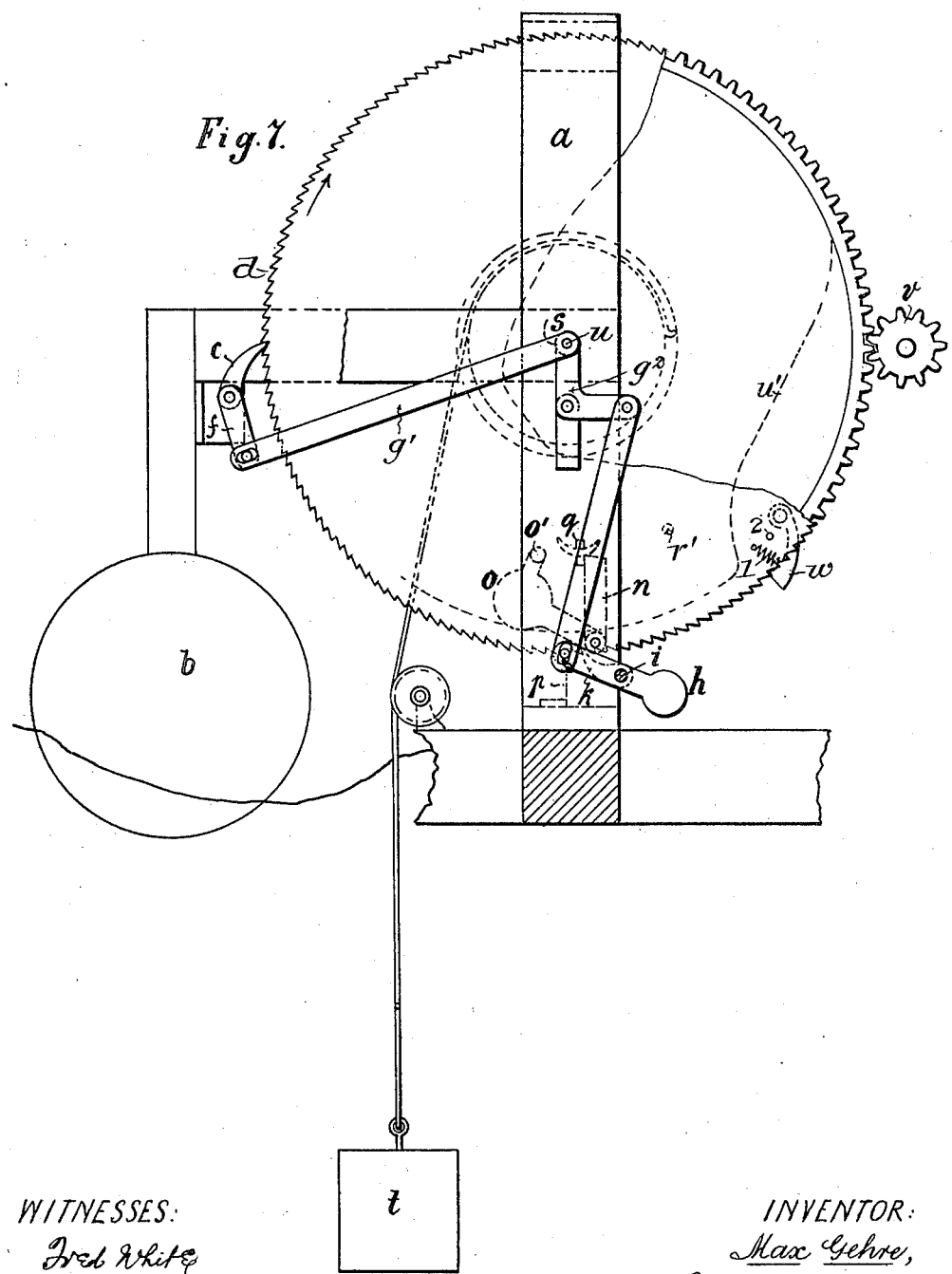

In the accompanying drawings, Figure 1 is a sectional front view of the ratchet-gearing, with the releasing mechanism, when the ratchet-pawl and the stop-pawl are engaged. Fig. 2 is a side view of the same; Fig. 3, a diagrammatic representation on a reduced scale; Fig. 4, a front view of the lower part of the device, on an enlarged scale, with the catch engaged; Fig. 5, a side view of same; Fig. 6, a side view with the pawl disengaged from the ratchet-gearing; Fig. 7, a side view of a modification of the ratchet-gearing; Fig. 8, a front view of the lower part of the arrangement, on an enlarged scale, with the pawl engaged; Fig. 9, a side view of same, and Fig. 10 a side view of the same form of construction with the pawl disengaged.

The shaft $s$ is mounted in a floating framework $a$, on which shaft a ratchet-wheel $d$ and a cord or belt drum or pulley $e$ are mounted. A float $b$, mounted on an arm, pivots or turns on the shaft $s$ when the said float is lifted or dropped by the waves of the sea. A pawl $c$ is mounted on the arm of the float $b$ in such a way that until its release takes place on the fall of the float $b$ it carries with it the ratchet-wheel $d$. On the descent of the float $b$ a stop-pawl or catch $k$, fixed to a spindle $i$, prevents the backward rotation of the wheel $d$. By the forward rotation of the wheel $d$ by means of the pawl $c$ under the action of the floating body, which forward movement is repeated for a certain period, and the step-by-step rotation of the shaft $s$ the cord or chain is wound upon the drum $e$ and the weight $t$ raised accordingly until the release of the pawl $c$ and catch $k$ takes place. For this object the pawls $c$ and $k$ are connected with one another by means of an arm $f$, fixed on the spindle of the pawl $c$, a link $g'$, an elbow-lever $g^2$, pivoted on the frame $a$, a link $g^3$, and a weighted arm $h$, fixed on the spindle $i$, in such a way that both pawls are released simultaneously. On the two pawls being operated the link $g'$ becomes to a certain extent the ratchet-shifting arm, which pivots on a pin $u$ on the elbow-lever $g^2$, said pin lying coaxially with the shaft $s$. Both in the link $g'$ and also the link $g^3$ there is allowed sufficient play for the pins of the arm $f$ on the spindle of the pawl $c$ and the pins $z$ of the releasing-arm $l$ of the pawl $k$ as required for the ratchet and stop movement of both pawls.

By means of a pawl $q$ or catch adapted to slide up and down in the frame $a$ an arm $n$ (see Figs. 2 and 5) is kept locked during the operation of the pawls $c$ and $k$, which arm is mounted on a spindle $m$, located in the frame, which spindle carries a weighted arm $o$, fixed to the spindle and adapted upon release of the arm $n$ to rotate the spindle, and thus move the arm $n$ to a depressed position. After about one revolution of the ratchet-wheel $d$ this pawl $q$ is released by means of a projection $r'$ on the said wheel $d$. The pawl or catch $q$ is formed with a curved face on its under side, so that it may be engaged and raised by said projection. The two arms $n$ and $o$ then turn, and the weighted arm $o$ encounters a pin $z$ on the releasing-arm $l$. This arm is also fixed to the spindle $i$, so that when its pin is struck by the weighted arm $o$ the arm $l$ is forced forwardly, thus rotating the spindle $i$ and depressing the pawl $k$ to a point where it is out of engagement with the ratchet $d$. This movement is communicated through $g^3$ $g^2$ $g'$ and $f$ to the pawl $c$, throwing the latter forward out of engagement with the ratchet. Both pawls $c$ and $k$ are held in disengaged position by the latter being caught by a catch $p$, mounted in the frame, while the ratchet-wheel $d$ is turned back by the action of the weight $t$, and the movement necessary for producing electricity is transmitted. For instance, a small tooth-wheel $v$ may be operated by means of a toothed wheel which is mounted with the ratchet-wheel $d$ on the shaft $s$ in order to impart the longer backward movement to a magnet and armature-coil or other magneto-electric devices.

The apparatus is more especially adapted for producing light by electricity at sea by moving, for instance, one or more magnets along a series of coils, thereby inducing and interrupting currents for producing in a suitable circuit electric light which appears and vanishes and serves for giving signals at sea, in light-houses, &c.

Toward the end of the backward rotation of the ratchet-wheel $d$ a projection $r^2$ thereon encounters the arm $n$ and returns same and also the weighted arm $o$ into the initial position. The upper face of the arm $n$ engages and raises the catch $q$, which drops back of the arm and holds it in its raised position, while by means of a lower projection on the arm $n$ the catch $p$ is turned back, as shown in Fig. 5, so that the pawl $k$ is released from the catch $p$, and under the action of the weighted arm $h$ the spindle $i$, the pawl $k$, and the pawl $c$ are turned, and said pawls again engage the teeth of the ratchet-wheel, and the movement hereinbefore described recommences.

The form of construction shown in Figs. 7 to 10 differs from that previously described advantageously by the avoidance of the jerky action produced by the projection $r^2$ of the ratchet-wheel. In this case the pin $z$ of the releasing-arm $l$ is, as before, adapted to be engaged by the weighted arm $o$ and throw the pawls $k$ and $c$ out of engagement with the ratchet $d$, and on the release of the two pawls the pawl $k$ is moved by the weight of the arm $o$, acting to rotate the spindle $i$, into the position shown in Fig. 10, in which it is held by the catch $p$, while by the action of the weight $t$ the ratchet-wheel $d$ is turned back. The projection $r'$ operates, as before, to raise the catch $q$ to release the arm $n$ at the end of the rotation of the wheel $d$, and the weighted arm $o$ operates as before described. The wheel is permitted to move backwardly under the influence of the weight $t$ until the wheel has completed its rotation, when the cam $u'$, which projects internally on the rim of the wheel toward the shaft $s$, engages a pin $o'$, fastened to the weighted arm $o$, and thus raises this arm, and with it the arm $n$, until the latter raises the pawl $q$ and engages it, as shown in Fig. 7; but the pawls $c$ and $k$ are still held away from the wheel $d$ by engagement of the pawl $k$ with the catch $p$. The wheel $d$, however, is caused by its inertia to continue its backward rotation until the cord or chain begins to wind about the drum $e$ in a reverse direction and the weight $t$ is slightly raised. This continued backward rotation moves the wheel $d$, so that a pawl $w$, which is pivoted thereon, passes the catch $p$, the pawl yielding against the pressure of its spring 1 to pass over the catch. The pin 2 prevents too great an inward movement of the pawl. After passing the catch the pawl $w$ springs outwardly, and when the wheel is again moved in a forward direction by the weight $t$ acting against it by reason of the reverse winding of the cord the face of the pawl $w$ engages the catch $p$, as shown in Fig. 9, forcing the latter backwardly and releasing the pawl $k$, which, with the pawl $c$, under the action of the weighted arm $h$, is moved into engagement with the wheel $d$, and the float $b$ again begins to impart movement to the wheel $d$, as before described.

Having now particularly described my invention, what I claim, and desire to secure by Letters Patent, is—

1. The combination of a wave-motor and means for storing power actuated thereby, with means for automatically disconnecting them after a predetermined movement to permit the power-storing means to operate independently of the wave-motor at periodical intervals for giving out the stored power.

2. The combination of a wave-motor and means for storing power actuated thereby, with means for automatically disconnecting them after a predetermined movement to permit the power-storing means to operate independently of the wave-motor at periodical intervals for giving out the stored power, and means for automatically connecting said motor and power-storing means after such independent operation of the latter.

3. A wave-motor comprising a float, a ratchet, means for storing power wound up by the forward movement of said ratchet, a pawl actuated by said float for moving said ratchet forward, and means for disconnecting said pawl after a predetermined movement to permit said ratchet to be driven backward.

4. A wave-motor comprising a float, a ratchet, means for storing power wound up by the forward movement of said ratchet, a pawl actuated by said float for moving said ratchet forward, means for disconnecting said pawl after a predetermined movement to permit said ratchet to be driven backward, and means for reëngaging said pawl at the end of said backward movement.

5. A wave-motor comprising a float, a ratchet-wheel, a weight wound up by the forward movement of said ratchet, a pawl actuated by said float for moving said ratchet forward, a retaining-pawl for preventing backward rotation of said wheel, and means for disconnecting both said pawls from said wheel after a predetermined movement to permit said wheel to be driven backward.

6. A wave-motor comprising a float, a ratchet-wheel, means wound up by the forward movement of said ratchet, a pawl actuated by said float for moving said ratchet forward, a retaining-pawl for preventing backward rotation of said wheel, means for disconnecting both said pawls from said wheel after a predetermined movement to permit said wheel to be driven backward, and means for reëngaging said pawls at the end of such backward movement.

7. A wave-motor comprising a float, a ratchet-wheel, means wound up by the forward movement of said ratchet, a pawl actuated by said float for moving said wheel forward, a retaining-pawl for preventing backward rotation of said wheel, means for disconnecting both said pawls from said wheel after a predetermined movement, means for locking said disconnecting means in inoperative position to permit said wheel to be driven backward, and means for unlocking said disconnecting means and reëngaging said pawls at the end of said backward movement.

8. A wave-motor comprising a float, a ratchet-wheel, means wound up by the forward movement of said ratchet, means for rotating said ratchet, and a releasing mechanism for said rotating means operated by a projection carried by said ratchet.

9. A wave-motor comprising a float, a ratchet-wheel, means wound up by the forward movement of said ratchet, means for rotating said ratchet, releasing mechanism adapted for disengaging said rotating means from said ratchet, a projection carried by the ratchet for operating said releasing means, and a second projection carried by the ratchet for reëngaging said rotating means.

10. A wave-motor comprising a float, a ratchet-wheel, means wound up by the forward movement of said ratchet, means for rotating said ratchet forwardly, and means for releasing said rotating means, a cam for operating said releasing means, and means for reëngaging said rotating means with the ratchet.

In testimony whereof I affix my signature in presence of two witnesses.

MAX GEHRE.

Witnesses:
WILLIAM ESSENWEIN,
GEO. P. PETTIT.